United States Patent
Nozaki

[19]

[11] Patent Number: 5,581,245
[45] Date of Patent: Dec. 3, 1996

[54] PAGING SYSTEM CONTROL APPARATUS

[75] Inventor: Reiko Nozaki, Tokyo, Japan

[73] Assignee: NEC Corporation, Tokyo, Japan

[21] Appl. No.: 327,413

[22] Filed: Oct. 21, 1994

[30] Foreign Application Priority Data

Oct. 22, 1993 [JP] Japan .................................. 5-287456

[51] Int. Cl.$^6$ .................................................. H04Q 7/00
[52] U.S. Cl. .............................. 340/825.52; 340/825.44; 370/412
[58] Field of Search ..................... 340/825.44, 825.47, 340/825.52; 370/79, 84, 95.1, 99, 94.1

[56] References Cited

U.S. PATENT DOCUMENTS 5,159,590  10/1992  Hamaguchi et al. .................. 370/95.1
5,166,932  11/1992  Hoff et al. ............................. 370/95.1

FOREIGN PATENT DOCUMENTS

91/06163  5/1991  WIPO .

Primary Examiner—Michael Horabik
Assistant Examiner—Edward Merz
Attorney, Agent, or Firm—Foley & Lardner

[57] ABSTRACT

In a paging system control apparatus that employs a POCSAG signal consisting of a plurality of batches each consisting of a plurality of groups, it is intended to improve the efficiency of using the batches by reallocating existing call signals in storing call signals of randomly input calls in a queue buffer for the POCSAG signal. The apparatus has first and second queue buffers that alternately serve as a current-use queue buffer and a waiting queue buffer. When it is found that the current-use queue buffer has no empty area for accommodating a call signal of a new call, all of the call signals stored in the current-use queue buffer are transferred to the waiting queue buffer so as to be reallocated in sequence from the head of the waiting queue buffer and so that empty areas are minimized. The reallocation-completed waiting queue buffer is changed to a new current-use queue buffer, and the new call signal is stored therein.

5 Claims, 10 Drawing Sheets

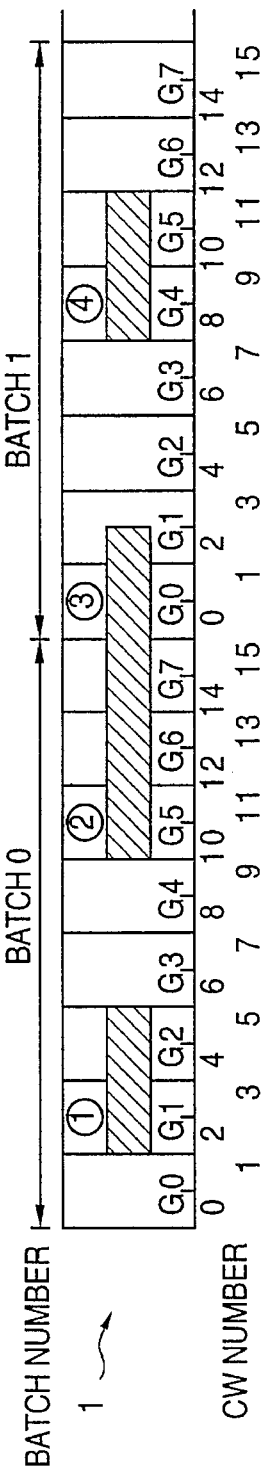
FIG. 3(a)
FIG. 3(b)
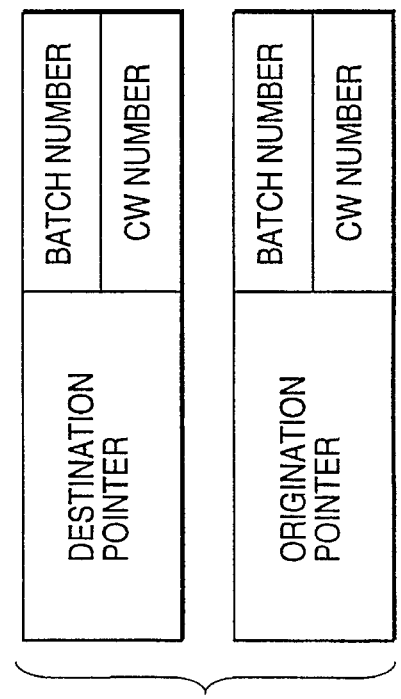
FIG. 7

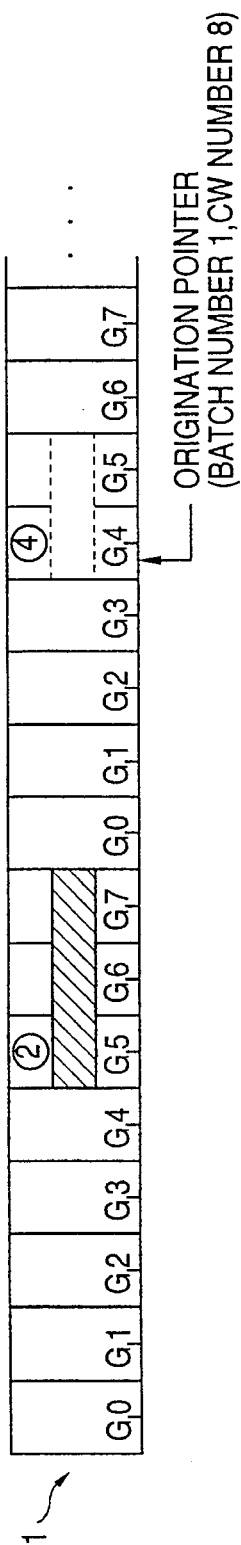
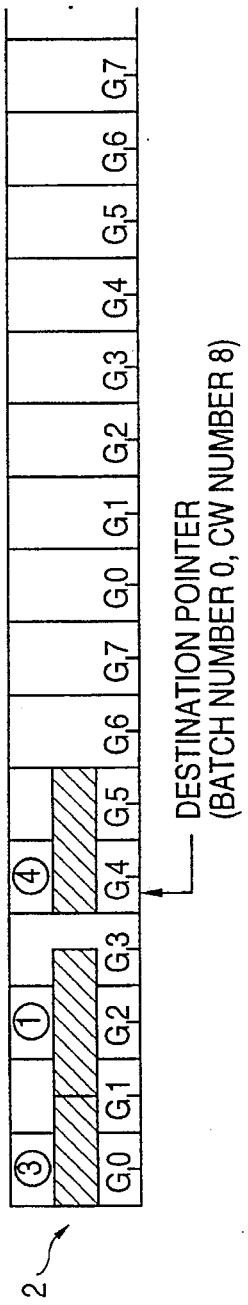
FIG. 10(a)
FIG. 10(b)

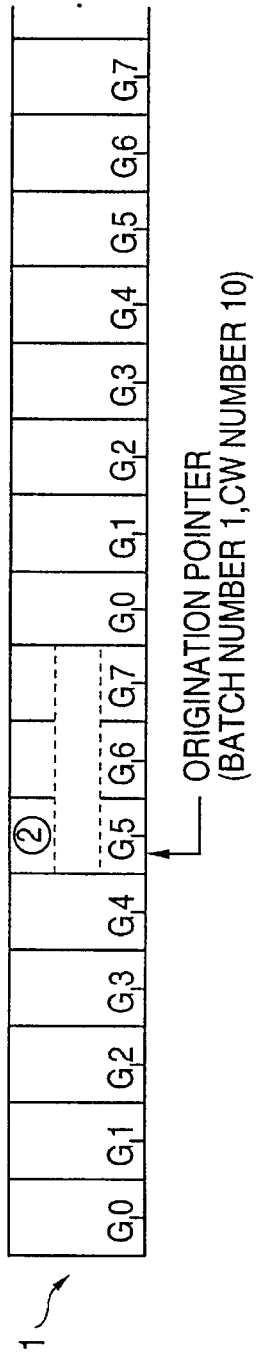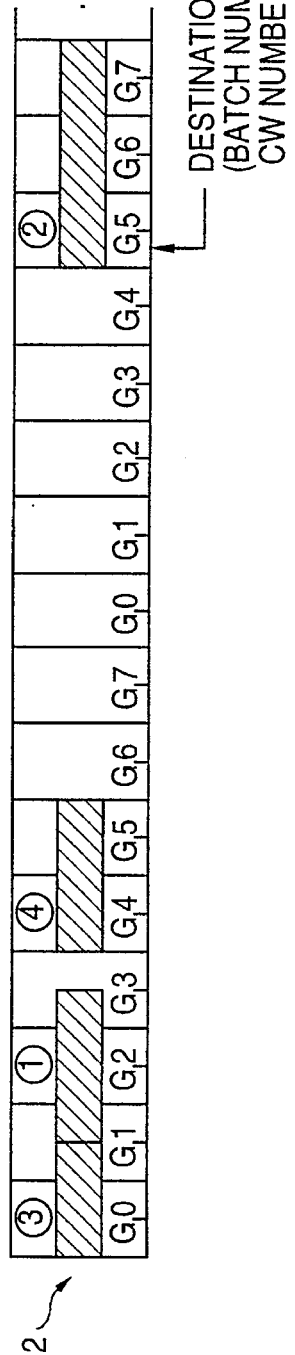
FIG. 11(a)
FIG. 11(b)

PAGING SYSTEM CONTROL APPARATUS

BACKGROUND OF THE INVENTION

1. Field of the Invention

The present invention relates to a paging system control apparatus and, more specifically, to a paging system control apparatus which performs a queuing operation which arranges the call signals of randomly input calls into a prescribed transmission signal format.

2. Description of the Prior Art

Among the transmission signal formats of a call signal in conventional paging systems is a format arranged in accordance with the international standard signal scheme known as the POCSAG signal (CCIR Recommendation 584-1 (1982–1986), Standard Codes and Formats for International Radio Paging).

As shown in FIG. 1, the transmission signal format of the POCSAG signal scheme consists of a plurality of batches. Each batch is divided into 8 groups (group 0 to group 7), and each group is further divided into 2 code words (hereinafter referred to as CWs). Each of the 8 groups corresponds to the 3 least significant bits of an identity assigned to each pagers (i.e., 000=group 0, and 111=group 7), and all of the pagers used in a paging system are distributed to the 8 groups.

Call data input to a paging system control apparatus are converted to a call signal having a paging signal format. The call signal is constituted of an address CW of one CW when it does not include a character display (messages), and of an address CW of one CW and one or more message CWs that correspond to the length of the character message to be displayed. An arrangement is so constituted that the address CW is necessarily placed in the group corresponding to the 3 least significant bits of a pager's address in a call. The message CW(s) occupies the CW next to the address CW and, if necessary, CWs in subsequent group or groups accord with the length of the message.

To transmit a POCSAG signal as described above, the conventional paging system control apparatus has one queue buffer having a configuration as shown in FIG. 2, and stores the call signals of the randomly input calls in their sequence of arrival and sequentially transmits those in a cyclical manner. In FIG. 2, batch n and batch n+1 denote memory areas of the queue buffer corresponding to the nth and (n+1)th batches, respectively, and G0–G7 represent memory areas for the respective groups of each batch and have a memory capacity of 2 CWs.

The above-described conventional paging system control apparatus stores the call signals of input calls in the queue buffer while queuing those in their sequence of arrival. Therefore, when call signals are stored in the queue buffer, for instance, as shown in FIG. 3 (b), the control apparatus cannot accept, for queuing, a new call of group 2 as shown in FIG. 3(a) in spite of the existence of empty areas separated from each other, because there cannot be secured an empty area having the required contiguous length in the area for group 2. As shown in the example above, batches of a transmission signal format are not used efficiently in the conventional control apparatus. That is, a valuable radio resource is not used effectively.

Accordingly, an object of the present invention is to minimize empty areas of batches, i.e., to use the batches more efficiently.

Also, in the present invention, the reallocation operation is made relatively easier by employing two queue buffers having the same configuration and performing the reallocation operation between the two queue buffers. Further, the reallocation operation is performed on all of the call signals accommodated in the queue buffers to secure, in one operation, as large empty areas as possible for not only one new call that initiates the reallocation operation but also new calls that will occur subsequently.

BRIEF SUMMARY OF THE INVENTION

According to the present invention, a paging system control apparatus which has a queue buffer for temporarily storing a transmission signal format that includes a plurality of batches each including a plurality of groups that are related to the identification numbers of respective pagers, and which stores randomly input call signals in the queue buffer and later transmits those together, comprises:

two queue buffers alternately used as a current-use queue buffer and a waiting queue buffer;

a reallocation section for transferring all of the call signals stored in the current-use queue buffer to the waiting queue buffer while reallocating the call signals, when it is found that no empty area is available for a new call during a queuing operation for the call signals in the current-use queue buffer; and a means for changing the waiting queue buffer to which the call signal have been reallocated completely to a new current-use queue buffer and the current-use queue buffer to a new waiting queue buffer, and then making the queuing operation on the call signals continue.

In the invention, when it is found that there is no empty area for accommodating a new call signal during a queuing operation for the call signals using one of the two queue buffers as the current-use queue buffer, the reallocation section transfers and reallocates all of the call signals to the waiting queue buffer, i.e., the other of the two queue buffers. The queuing operation for the call signals is continued by changing the waiting queue buffer to which the call signals have been reallocated completely to a new current-use queue buffer.

BRIEF DESCRIPTION OF THE DRAWINGS

The present invention will be described in further detail with reference to the accompanying drawings, in which:

FIG. 3(a) shows a new call;

FIG. 3(b) shows a call signal accommodation state of a queue buffer that does not allow accommodation of the new call in FIG. 3(a);

FIG. 7 describes a destination pointer and an origination pointer;

FIGS. 10(a) and 10(b) show a state in which call signal (4) has been transferred, with reallocation, from the first queue buffer to the second queue buffer;

FIGS. 11(a) and 11(b) show a state in which call signal (2) has been transferred, with reallocation, from the first queue buffer to the second queue buffer.

DETAILED DESCRIPTION OF THE PREFERRED EMBODIMENT

An embodiment of the present invention will be described in detail with reference to the drawings.

Figure 4:
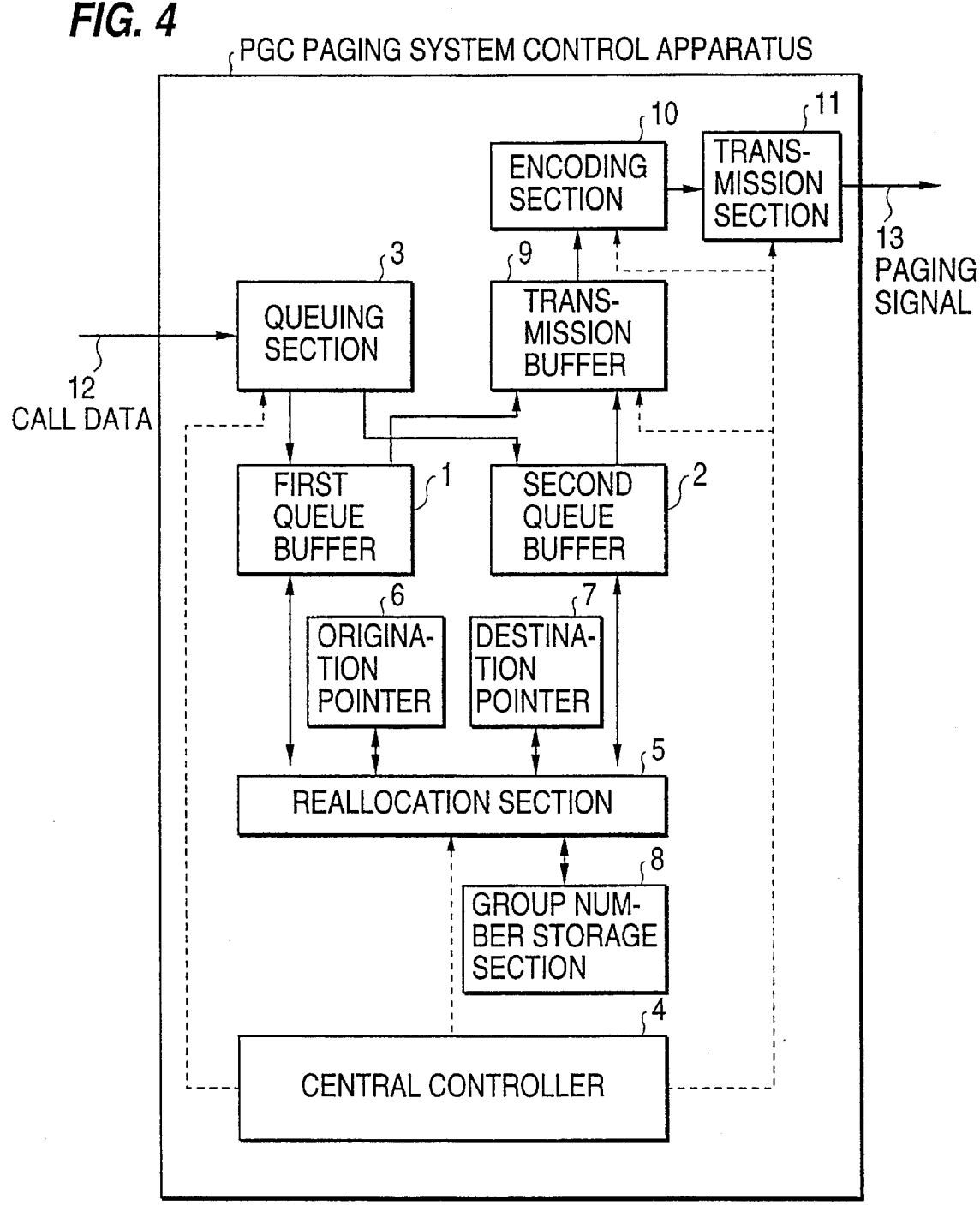
FIG. 4 is a block diagram showing the main part of a paging system control apparatus according to an embodiment of the present invention.

Referring to FIG. 4, a paging system control apparatus (PGC) according to an embodiment of the invention includes a first queue buffer 1, a second queue buffer 2, a queuing section 3, a central controller 4, a reallocation section 5, an origination pointer 6, a destination pointer 7, a group number storage section 8, a transmission buffer 9, an encoding section 10, and a transmission section 11.

Figure 1:
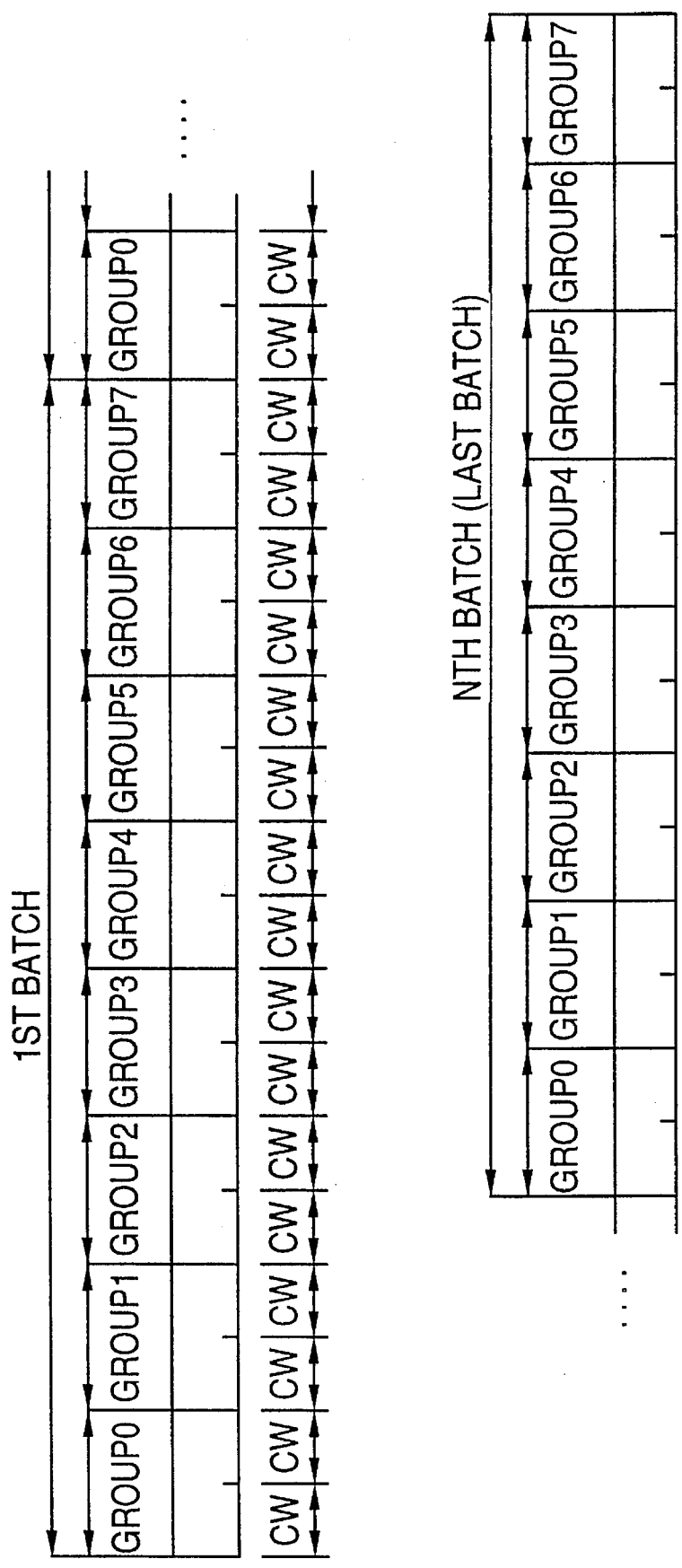
FIG. 1 shows the format of a POCSAG signal.
Figure 2:
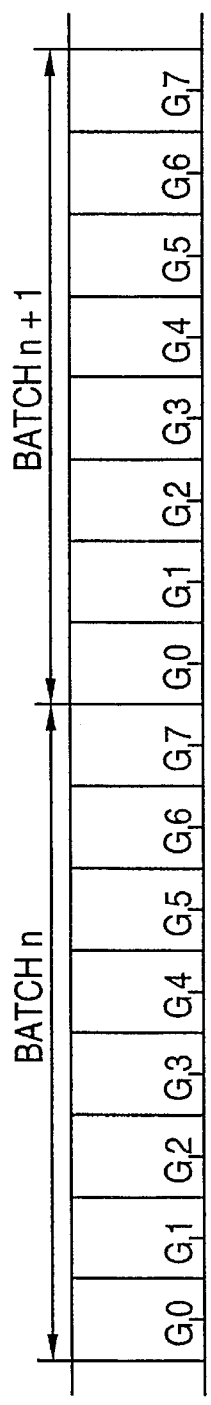
FIG. 2 shows an example of a configuration of a queue buffer.

The first and second queue buffers 1 and 2 have the same configuration as shown in FIG. 2, and are alternately used as a current-use queue buffer and a waiting queue buffer.

The queuing section 3 converts call data 12 that is randomly generated externally to a call signal having a paging signal format under the control of the central controller 4, and inputs it to one of the first and second queue buffers 1 and 2 currently in use. If the current-use queue buffer has no empty area for accommodating the incoming call signal, the central controller 4 activates the reallocation section 5, which then transfers all of the call signals of the current-use queue buffer to the waiting queue buffer while reallocating these. The reallocation section 5 then makes the call-signal-reallocated waiting queue buffer a new current-use queue buffer, and makes the current-use queue buffer a new waiting queue buffer. The reallocation section 5 continues to perform the reallocation operation on the new current-use queue buffer.

The content of the current-use queue buffer is transferred to the transmission buffer 9 during a certain period under the control of the central controller 4. After the encoding section 10 adds a BCH/parity to the call signal that is provided by the transmission buffer 9, the transmission section 11 outputs the resulting signal as the paging signal 13.

Figure 5:
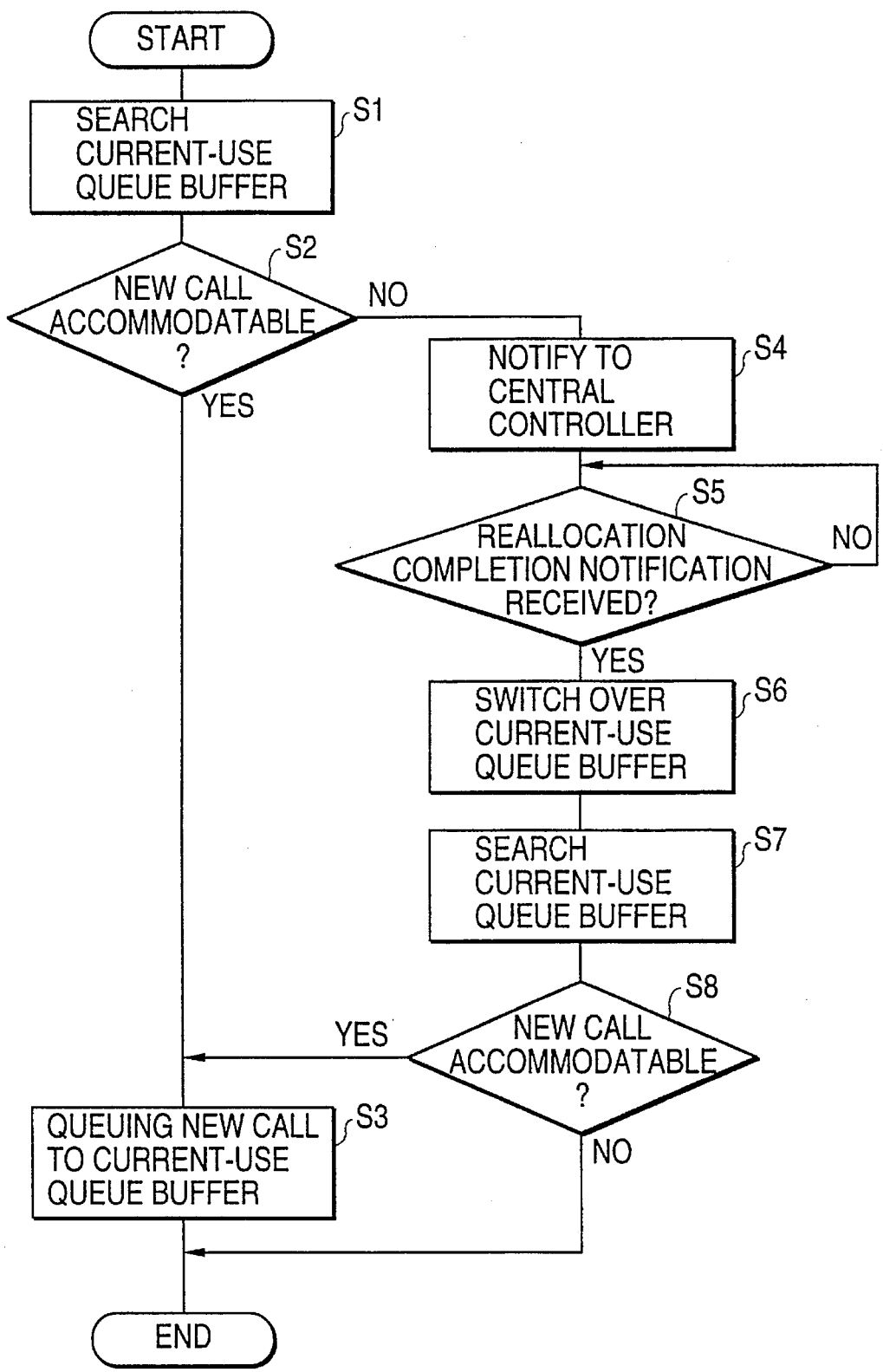
FIG. 5 is a flowchart showing an example of an operation of a queuing section.

FIG. 5 is a flowchart showing an example of operation of the queuing section 3. Upon occurrence of call data 12, the queuing section 3 searches for a current-use queue buffer (it is assumed that at present the first queue buffer 1, for instance, is a current-use queue buffer; step S1), and judges whether the first queue buffer 1 has an empty area for accommodating a call signal of the incoming call data 12 (step S2). On the one hand, if the judgment in step S2 is yes, the queuing section 3 stores the call signal into the first queuing buffer 1 (step S3).

On the other hand, if the judgment in step S2 is no, the queuing section 3 informs the central controller 4 that the first queue buffer 1 cannot accommodate the new call (step S4), and waits for a notification of reallocation completion that will be sent by the central controller 4 (step S5). If the notification has been received (yes in step S5), the queuing section 3 switches the current-use queue buffer to the second queue buffer 2 (step S6). The queuing section 3 then searches for the second queue buffer 2 (step S7), and judges whether it has an empty area for accommodating the call signal of the incoming call data 12 (step S8). If the judgment in step S8 is yes, the queuing section 3 stores the call signal into the second queue buffer 2 (step S3). If the judgment in step S8 is no, the queuing section 3 abandons the queuing of the call signal at this time. That is, the call at this time is rejected.

Figure 6:
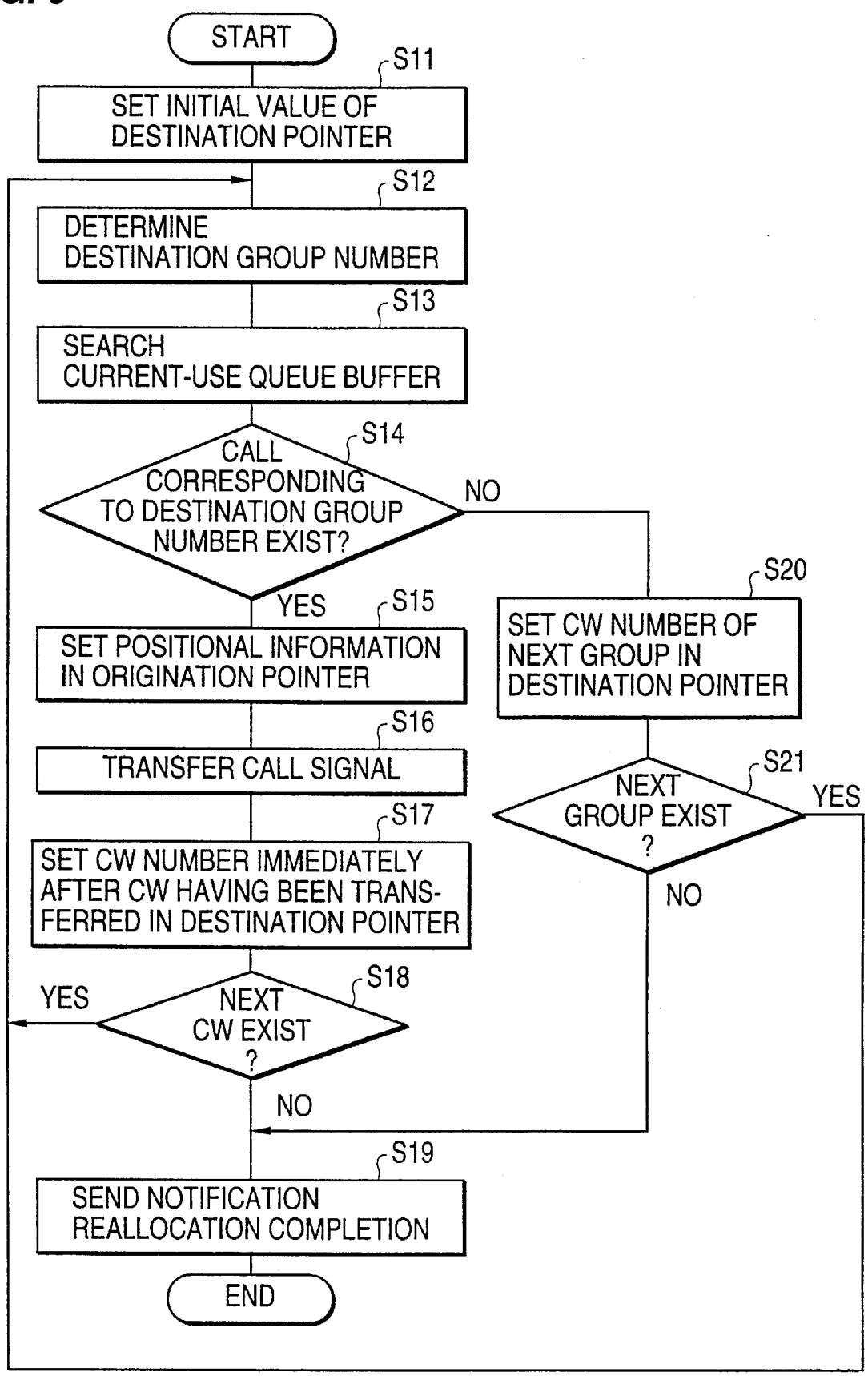
FIG. 6 is a flowchart showing an example of an operation of the reallocation section.

FIG. 6 is a flowchart showing an example of an operation of the reallocation section 5. When activated by the central controller 4 with the designation of the current-use queue buffer, the reallocation section 5 first sets the initial values of the destination pointer 7 (step S11). The destination pointer 7 serves to point to a batch number and a CW number as shown in FIG. 7. The initial values of these numbers are set to 0 to allow the calls of the current-use queue buffer to be stored in the waiting queue buffer from the head CW (CW number 0) of its head batch (batch number 0).

The reallocation section 5 then determines, based on the current CW number of the destination pointer 7, the number (destination group number) of a group to which a call to be transferred from the current-use queue buffer to the waiting queue buffer belongs, and sets it in the group number storage section 8 (step S12). More specifically, the group number is determined as 0 when the CW number of the destination pointer 7 is 0 or 1; the group number is determined as 1 when the CW number is 2 or 3; . . . ; and the group number is determined as 7 when the CW number is 14 or 15. The number thus determined is set in the group number storage section 8.

The reallocation section 5 then retrieves, from the current-use queue buffer, one call signal belonging to the group of the destination group number set in the group number storage section 8 (step S13). If a call signal corresponding to the destination group number is found by the above operation (yes in step S14), the positional information or the call signal thus found on the current-use queue buffer is set in the origination pointer 6 (step S15). As shown in FIG. 7, the origination pointer 6 serves to point a batch number and a CW number. In step S15, the batch number of the origination pointer 6 is set to the number of the batch of the current-use queue buffer that accommodates the call signal found, and the CW number of the origination pointer 6 is set to the head CW of the above batch of the current-use queue buffer.

The reallocation section 5 then transfers the call signal on the current-use queue buffer that is identified by the origination pointer 6 (that is, the call signal to be transferred that has been found in step S13) to the location in the waiting queue buffer that is indicated by the destination pointer 7 (step S16). Thus, one call signal has been transferred from the current-use queue buffer to the waiting queue buffer with its position changed.

The CW number of the destination pointer 7 is then set in the CW number immediately after the number of the CW of the waiting queue buffer that is now occupied by the call signal transferred in step S16 (step S17). If such a setting can be made, that is, if there remains, in the waiting queue buffer, a CW immediately following the CW having been transferred in step S16 (yes in step S18), the process returns to step S12 to repeat the above operation. If, on the one hand, no such CW remains, which means the completion of reallocation, the reallocation section 5 informs the central controller 4 of reallocation completion (step S19) and terminates the processing in FIG. 6.

On the other hand, if there is not found, in the current-use queue buffer, any call signal belonging to the group of the destination group number that is set in the group number storage section 8 (no in step S14), the CW number of the destination pointer 7 is set for the CW number of the next group (step S20). More specifically, if the current CW number is 0 or 1, for instance, the CW number of the destination pointer 7 is set to 2 because the next group has CW numbers 2 and 3. If the current CW number is 14 or 15, the CW number of the destination pointer 7 is set to 0 because the next group has CW numbers 0 and 1, and its batch number is incremented by one. However, if the batch number of the destination pointer 7 indicates the final batch, and if the current CW number is 14 or 15, there remain no CWs for the next group. Step S21 serves to detect such a case. On the one hand, if no CWs remain for the next group, the reallocation section 5 proceeds to step S19 with a judgment that the reallocation operation should be terminated. On the other hand, if the destination pointer 7 can be set to a CW number of the next group (yes in step S21), processing returns to step S12 to repeat the above operation.

As the reallocation section 5 executes the above processing, the call signals accommodated in the current-use queue buffer are transferred and stored in the waiting queue buffer from the head CW of its head batch while being reallocated so as to minimize empty areas.

A specific example will be described below to facilitate the understanding of the above reallocation operation.

It is assumed that the first and second queue buffers 1 and 2 (see FIG. 4) are used as the current-use queue buffer and the waiting queue buffer, respectively, and that the first queue buffer 1 stores call signals (1)–(4) as shown in FIG. 3 (b). It is also assumed that the reallocation section 5 has been activated because the first queue buffer 1 does not have an empty area for accommodating a new call signal of a group number 2 that requires 6 CWs (see FIG. 3 (a)).

Figures 8A, 8B:
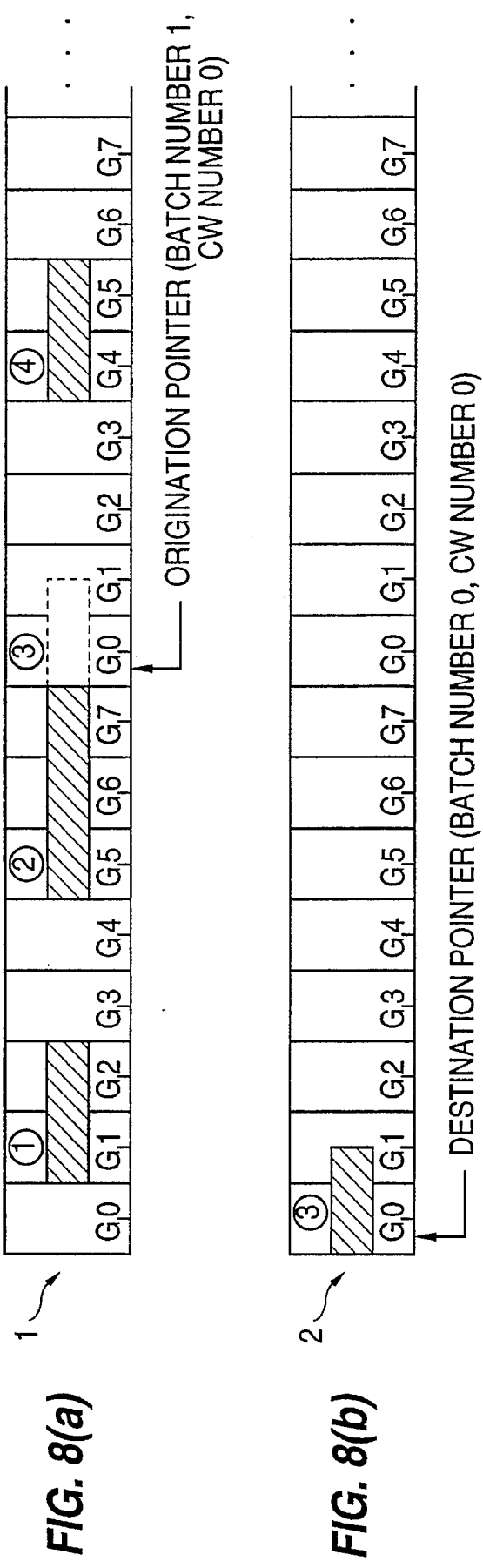
FIGS. 8(a) and 8(b) show a state in which call signal (3) has been transferred, with reallocation, from a first queue buffer to a second queue buffer.

First, the reallocation section 5 sets the batch number and the CW number of the destination pointer 7 to 0 (step S11). Since the CW number of the destination pointer 7 is 0, the reallocation section 5 determines that the destination group number is 0, and sets it in the group number storage section 8 (step S12). The reallocation section 5 searches for one call signal of the group number 0 from the head of the first queue buffer 1 (step S13), to thereby detect the call signal (3) (see FIG. 3 (b); yes in step S14)). The reallocation section 5 then sets the batch number and the CW number of the origination pointer 6 at 1 and 0, respectively, which are positional information for call signal (3) (step S15). The reallocation section 5 transfers call signal (3), which is in the first queue buffer 1 at batch number 1 and CW number 0 that are indicated by the origination pointer 6, to the location of the second queue buffer 2 having batch number 0 and CW number 0 that are indicated by the destination pointer 7 (step S16). FIGS. 8 (a) and 8 (b) show this state.

Figure 9A:
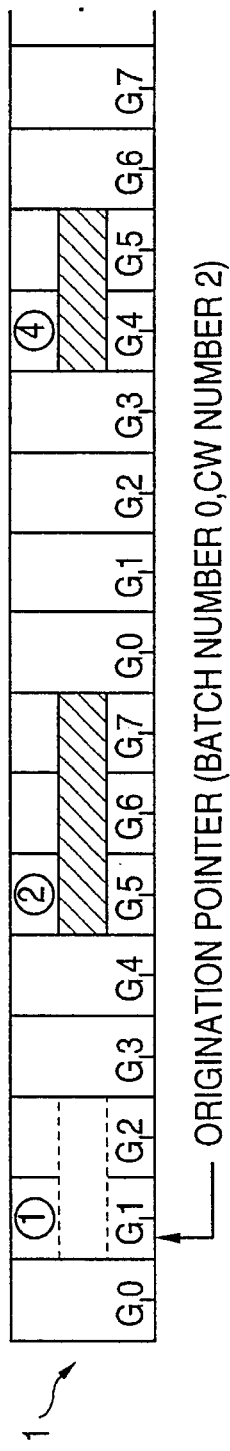
FIGS. 9(a) and 9(b) show a state in which call signal (1) has been transferred, with reallocation, from the first queue buffer to the second queue buffer.
Figure 9B:
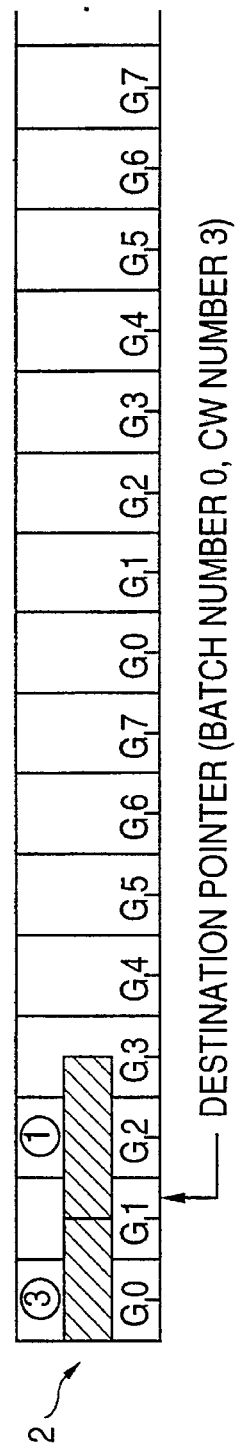

Since call signal (3) having a size of 3 CWs has been reallocated to the second queue buffer 2 from batch number 0 and CW number 0, the reallocation section 5 sets the CW number of the destination pointer 7 to 3 (step S17). Returning to step S12, the reallocation section 5 determines that the destination group number is 1 because the CW number of the destination pointer 7 is 3, and sets group number 1 in the group number storage section 8. The reallocation section 5 then searches for one call signal of group number 1 (step S13), to thereby detect call signal (1) (see FIG. 8 (a); Yes in step S14). The reallocation section 5 then sets the batch number and the CW number of the origination pointer 6 to 0 and 2, respectively, which are positional information for call signal (1) (step S15). The reallocation section 5 transfers call signal (1), which is in the first queue buffer 1 at batch number 0 and CW number 2 that are indicated by the origination pointer 6, to the location of the second queue buffer 2 having batch number 0 and CW number 3 that are indicated by the destination pointer 7 (step S16). FIGS. 9 (a) and 9 (b) show this state.

Since call signal (1) having a size of 4 CWs has been reallocated to the second queue buffer 2 from batch number 0 and CW number 3, the reallocation section 5 sets the CW number of the destination pointer 7 to 7 (step S17). Returning to step S12, the reallocation section 5 determines that the destination group number is 3 because the CW number of the destination pointer 7 is 7, and sets group number 3 in the group number storing section 8. The reallocation section 5 then searches for one call signal of group number 3 (step S13). It is now assumed that there is no call signal of group number 3 in the first queue buffer, in which case the judgment in step S14 is no. Since the destination pointer 7 currently has batch number 0 and CW number 7, the process returns to step S12 after the CW number is changed from 7 to 8 (next group).

Returning to step S12, the reallocation section 5 determines that the destination group number is 4 because the CW number of the destination pointer 7 is 8, and sets group number 4 in the group number storage section 8. The reallocation section 5 then searches for one call signal of group number 4 (step S13), to thereby detect call signal (4) (see FIG. 9 (a); Yes in step S14). The reallocation section 5 then sets the batch number and the CW number of the origination pointer 6 to 1 and 8, respectively which are positional information of call signal (4) (step S15). The reallocation section 5 transfers call signal (4), which is in the first queue buffer 1 at batch number 1 and CW number 8 that are indicated by the origination pointer 6, to the location of the second queue buffer 2 having batch number 0 and CW number 8 that are indicated by the destination pointer 7 (step S16). FIGS. 10 (a) and 10 (b) show this state.

Since call signal (4) having a size of 4 CWs has been reallocated to the second queue buffer 2 from batch number 0 and CW number 8, the reallocation section 5 sets the CW number of the destination pointer 7 to 12 (step S17). Returning to step S12, the reallocation section 5 determines that the destination group number is 6 because the CW number of the destination pointer 7 is 12, and sets group number 6 in the group number storage section 8. The reallocation section 5 then searches for one call signal of group number 6 (step S13). It is now assumed that there is no call signal of group number 6 in the first queue buffer, in which case the judgment in step S14 is no. Since the destination pointer 7 currently has batch number 0 and CW number 12, the process returns to step S12 after the CW number is changed from 12 to 14 (next group).

Returning to step S12, the reallocation section 5 determines that the destination group number is 7 because the CW number of the destination pointer 7 is 14, and sets group number 7 in the group number storage section 8. The reallocation section 5 then searches for one call signal of group number 7 (step S13). It is now assumed that there is no call signal of group number 7 in the first queue buffer, in which case the judgment in step S14 is no. Since the destination pointer 7 currently has batch number 0 and CW number 14, the process returns to step S12 after the batch number and the CW number are changed from 1 and 0, respectively. Therefore, the retrieval will be performed to again try to find, first, a call signal of destination group number 0.

With the process proceeding in the above manner, when the process returns to step S12 in a state in which the batch number and the CW number of the destination pointer 7 are set at 1 and 10, respectively, the reallocation section 5 determines that the destination group number is 5 because the CW number of the destination pointer 7 is 10, and sets group number 10 in the group number storage section 8. The reallocation section 5 then searches for one call signal of group number 5 from the head of the first queue buffer 1 (step S13), to thereby detect call signal (2) (see FIG. 10 (a); Yes in step S14). The reallocation section 5 then sets the batch number and the CW number of the origination pointer 6 at 0 and 10, respectively, which are positional information for call signal (2) (step S15). The reallocation section 5 transfers call signal (2), which is in the first queue buffer 1 at batch number 0 and CW number 10 that are indicated by the origination pointer 6, to the location of the second queue buffer 2 having batch number 1 and CW number 10 that are indicated by the destination pointer 7 (step S16). FIGS. 11 (a) and 11 (b) show this state.

Since call signal (2) having a size of 6 CWs has been reallocated to the second queue buffer 2 from batch number 1 and CW number 10, the reallocation section 5 sets the batch number and the CW number of the destination pointer 7 at 2 and 0, respectively (step S17). Therefore, after returning to step S12, retrieval will be continued to again try to find, first, a call signal of destination group number 0.

Figure 12:
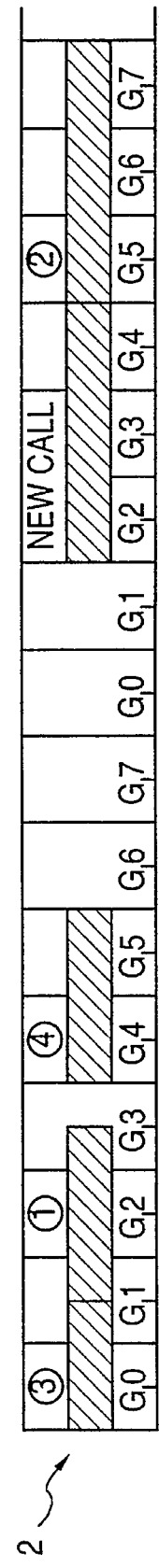
FIG. 12 shows a state in which a new call has been stored into the reallocation-completed second queue buffer.

The first queue buffer 1 is cleared and the process of FIG. 6 is finished when the above operation leads to a state that the batch number of the destination pointer 7 points to the final batch number and its CW number points to the final CW number, so that the judgment in step S18 or S21 turns to no. The reallocation-completed second queue buffer 2 then is made the current-use queue buffer, and the call signal of the new call shown in FIG. 3 (a) is stored in the second queue buffer 2 in step S3 of the processing executed by the queuing section 3 (see FIG. 5). FIG. 12 shows this state.

Although the embodiment of the invention has been described above, the invention is not limited to the above embodiment but various additions and modifications are possible as exemplified below.

It may happen, although rarely, that all of the call signals of the current-use queue buffer cannot be transferred to the waiting queue buffer. To accommodate such a case, at a point in time when it has become apparent that all of the call signals of the current-use queue buffer cannot be transferred to the waiting queue buffer, reallocation may be abandoned with the current-use queue buffer restored to the state before the reallocation operation. This can, for example, be conducted such that a call signal is not deleted from the current-use queue buffer even when it is transferred to from the current-use queue buffer to the waiting queue buffer and the fact of the transfer is recorded in, for instance, a separate table. When the reallocation operation is completed successfully, the current-use queue buffer is cleared. If, however, the reallocation must be abandoned, the current-use queue buffer is used as it is.

Further, it may happen, although rarely, that the accommodation state of call signals is not changed at all by a reallocation operation. In such a case, further reallocation operations will be useless. Therefore, if it is found that call signal arrangements before and after a reallocation operation are completely the same by comparing these arrangements, reallocation operations may be avoided until the next transmission cycle.

According to the invention as described above, the following advantages can be obtained:

Since call signals accommodated in one queue buffer are transferred, with reallocation, to another queue buffer while empty areas for accommodating new call signals are secured, empty areas of the batches are minimized, i.e., the batches are used more efficiently. That is, an economical paging system can be provided which uses a valuable radio resource more effectively.

Since two queue buffers are employed and the reallocation operation is performed between the two queue buffers, the reallocation operation is made easier than in case of using a single queue buffer.

Since the reallocation operation is performed on all of the call signals stored in the queue buffer, there can be secured, by a single reallocation operation, as large an empty area as possible not only for one new call that initiates the reallocation operation but also new calls that will occur subsequently.

Although the present invention has been fully described by way of the preferred embodiment thereof with reference to the accompanying drawings, various changes and modifications will be apparent to those skilled in the art. Therefore, unless these changes and modifications otherwise depart from the scope of the present invention, they should be construed as included therein.

What is claimed is:

1. A paging system control apparatus employing a frame format having a plurality of batches each divided into a plurality of group positions, each group position corresponding to a group number assigned to one of a plurality of pagers and providing a predetermined number of storing positions for a random, variable length call signal for the one pager, said apparatus comprising:

a pair of queue buffers, one being used as a current-use queue buffer and another being used as a waiting queue buffer, for storing call signals in accordance with the frame format;

a queuing section,
for allocating an incoming call signal for a pager in chronological order when storing positions for the incoming call signal are available in the current-use queue buffer at positions starting from a group position that corresponds to the group number of the pager,
for requesting reallocation of call signals, previously allocated to the current-use queue buffer, to the waiting queue buffer when storing positions for an incoming call signal are not available in the current-use queue buffer, and for allocating the incoming call signal to the waiting queue buffer;

a reallocation section,
for specifying a group number of a call signal to be searched in the current-use queue buffer as a candidate call signal for reallocating to the waiting queue buffer by sequentially determining a group number corresponding to a vacant position in the waiting queue buffer,
for searching for a call signal, stored in the current-use queue buffer, having the same group number as the vacant position,
for reallocating the call signal having the same group number from the current-use queue buffer to sequential specified positions beginning with the vacant position; and control means for switching the pair of queue buffers, the current-use queue buffer becoming a new waiting queue buffer and the waiting queue buffer becoming a new current-use queue buffer, upon detecting completion of all operations of the reallocation section.

2. A method of paging system control in an apparatus employing a pair of queue buffers, one being used as a current-use queue buffer and another being used as a waiting queue buffer, for storing a random, variable length incoming call signal for a pager in accordance with a frame format having a plurality of batches each divided into a plurality of group positions, each group position corresponding to a group number assigned to one of a plurality of pagers and providing a predetermined number of storing positions for an incoming call signal for a corresponding pager, said method comprising the steps of:

allocating the incoming call signal in chronological order when storing positions for the incoming call signal are available in the current-use queue buffer at positions starting from a group position that corresponds to the group number of the pager;

requesting reallocation of call signals, previously allocated to the current-use queue buffer, to the waiting queue buffer when storing positions for the incoming call signal are not available in the current-use queue buffer;

specifying a group number of a call signal to be searched in the current-use queue buffer as a candidate call signal for reallocating to the waiting queue buffer by sequentially determining a group number corresponding to a vacant position in the waiting queue buffer;

searching for a call signal, stored in the current-use queue buffer, having the same group number as the vacant position;

reallocating the call signal having the same group number from the current-use queue buffer to specified positions beginning with the vacant position;

switching the pair of queue buffers, the current-use queue buffer becoming a new waiting queue buffer and the waiting queue buffer becoming a new current-use queue buffer, upon detecting completion of the reallocating step; and allocating the incoming call signal to the new current-use queue buffer when storing positions for the incoming call signal are available in the new current-use queue buffer at sequential positions starting from a group position corresponding to the group number of the pager.

3. A method of paging system control according to claim 2, further comprising the step of:

rejecting the incoming call signal when storing positions for the incoming call signal are not available in the new current-use queue buffer at sequential positions starting from a group position corresponding to the group number of the pager.

4. A method of paging system control according to claim 2, wherein the requesting, specifying, searching, reallocating and switching steps are repeated whenever storing positions for an incoming call signal are not available in the current-use queue buffer.

5. A method of paging system control according to claim 4, wherein the steps are repeated until the expiration of a periodic radio transmission signal time period.

* * * * *